(12) United States Patent
Staubly

(10) Patent No.: US 8,646,094 B2
(45) Date of Patent: Feb. 4, 2014

(54) METHOD AND APPARATUS FOR PREVENTING UNAUTHORIZED ACCESS TO INFORMATION STORED IN A NON-VOLATILE MEMORY

(75) Inventor: Steven Staubly, Newtown, CT (US)

(73) Assignee: Owl Computing Technologies, Inc., Ridgefield, CT (US)

(*) Notice: Subject to any disclaimer, the term of this patent is extended or adjusted under 35 U.S.C. 154(b) by 77 days.

(21) Appl. No.: 13/314,167

(22) Filed: Dec. 7, 2011

(65) Prior Publication Data

US 2013/0152206 A1    Jun. 13, 2013

(51) Int. Cl.
| | |
|---|---|
| G06F 7/04 | (2006.01) |
| G06F 17/30 | (2006.01) |
| G06F 1/26 | (2006.01) |
| G06F 11/00 | (2006.01) |
| H04N 7/16 | (2011.01) |
| G08B 13/00 | (2006.01) |
| G08B 21/00 | (2006.01) |
| G08B 29/00 | (2006.01) |

(52) U.S. Cl.
USPC ............................................. 726/26; 726/34

(58) Field of Classification Search
USPC ................... 726/26, 34–36; 713/194
See application file for complete search history.

(56) References Cited

U.S. PATENT DOCUMENTS

| | | | | |
|---|---|---|---|---|
| 5,859,968 A | * | 1/1999 | Brown et al. ................... | 726/36 |
| 5,880,523 A | * | 3/1999 | Candelore ...................... | 257/679 |
| 8,068,415 B2 | * | 11/2011 | Mraz .............................. | 370/230 |
| 8,308,820 B2 | * | 11/2012 | Scheidt et al. .................. | 726/35 |
| 2006/0109117 A1 | * | 5/2006 | Hsu et al. ........................ | 340/571 |
| 2008/0034405 A1 | * | 2/2008 | McLean .......................... | 726/2 |
| 2008/0259929 A1 | * | 10/2008 | Mraz .......................... | 370/395.1 |
| 2010/0031064 A1 | * | 2/2010 | Walmsley ..................... | 713/194 |
| 2012/0151121 A1 | * | 6/2012 | Braga ............................. | 711/103 |
| 2012/0151580 A1 | * | 6/2012 | Chae et al. ...................... | 726/22 |

FOREIGN PATENT DOCUMENTS

EP    2022538 A1 *    2/2009

OTHER PUBLICATIONS

U.S. Appl. No. 12/760,162.

* cited by examiner

*Primary Examiner* — Christopher Revak
*Assistant Examiner* — Vadim Savenkov
(74) *Attorney, Agent, or Firm* — John S. Economou

(57) ABSTRACT

A communications device for ensuring secure data transfer provided having an interface device for controlling data transfer, an integrated circuit coupled to the interface device and having a processor, a non-volatile memory for storing at least program code for the processor, a volatile memory, an input pin and an output pin; and an electrical conductor which electrically connects the input pin and the output pin. The electrical conductor passes through an external portion of the enclosure, e.g., a slot, which allows a user to easily sever the electrical conductor. In operation, a portion of the program code detects when the electrical conductor is severed and causes the program code in the non-volatile memory to be erased, data transfer via the interface device to be disabled, and power to the integrated circuit cut off to ensure that all information in volatile memory is erased.

4 Claims, 4 Drawing Sheets

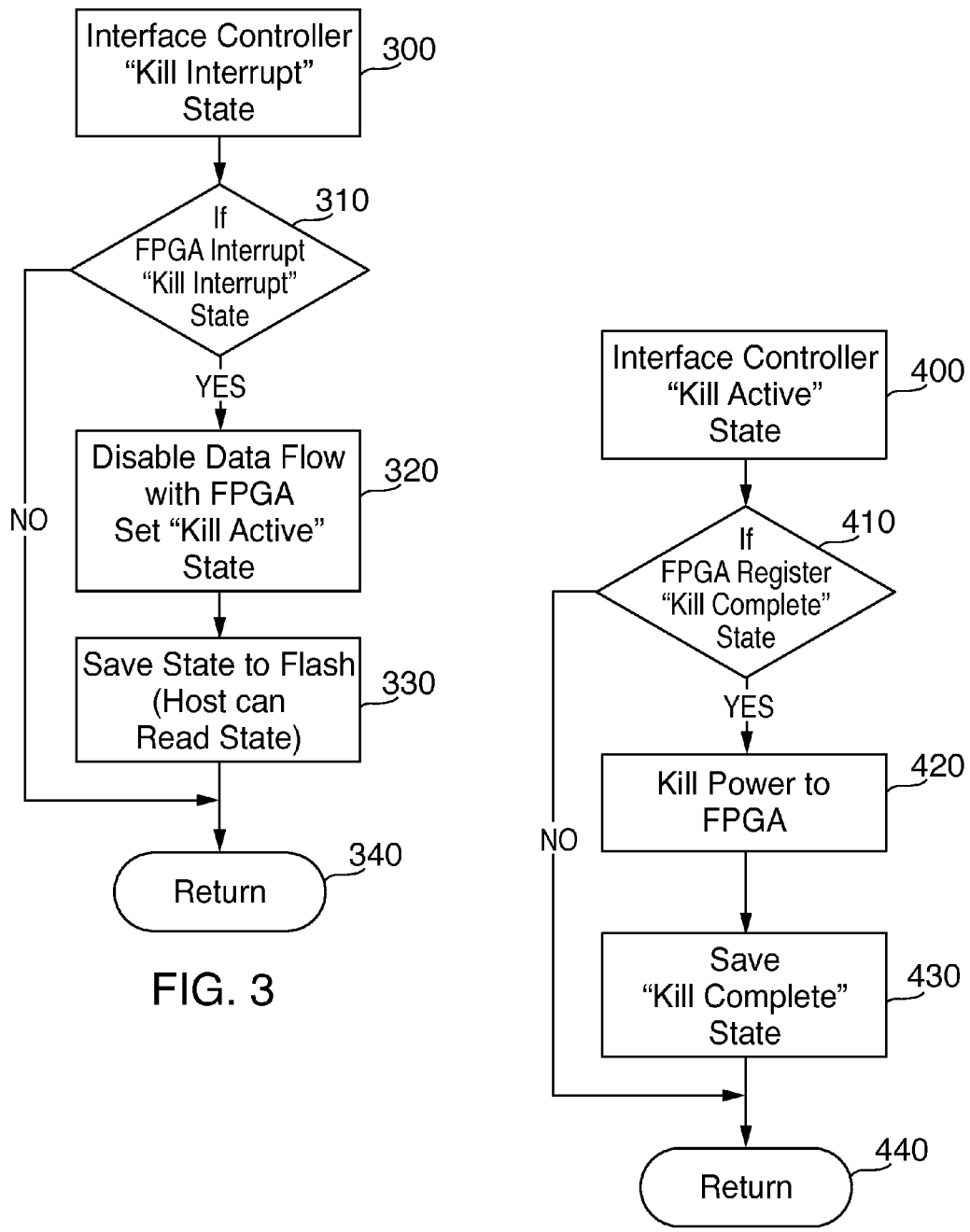

METHOD AND APPARATUS FOR PREVENTING UNAUTHORIZED ACCESS TO INFORMATION STORED IN A NON-VOLATILE MEMORY

FIELD OF INVENTION

This invention relates generally to a method and apparatus for preventing unauthorized access to information stored in a non-volatile memory. More particularly, this invention relates to a network appliance that provides one-way data transfer under the control of program code stored in one or more non-volatile memories and a way for a user to selectively quickly and efficiently erase the program code from the one or more non-volatile memories and to permanently disable all data transfer.

BACKGROUND OF THE INVENTION

Protection of computer or data networks from undesired and unauthorized data disclosure, interception or alteration has been a perennial concern in the field of computer and network security, for which firewalls and anti-spyware software have been developed to address security threats to computers and networks connected to the Internet and to protect them from possible cyberattacks, such as Trojan horse-type viruses or worms that may trigger undesired and unauthorized data disclosure by these computers and networks. However, for high security computer networks, such as those used by government agencies, intelligence communities, and certain commercial applications, conventional network security devices such as firewalls may not provide sufficiently reliable protection from undesired disclosure.

A high level of network security can be attained through the use of one-way data links, which isolate secure networks from security breaches (i.e., undesired and unauthorized data flow out of the secure network) while still allowing data from a low security environment to enter the network in a controlled manner. Various apparatus and methods have been developed for implementing one-way data transfer to a secure network.

Methods and systems for one-way data transfer include standard Internet firewalls as well as operating systems configured with specialized rules for restricted unidirectional information flow. Systems such as these are designed to have great flexibility, but are now being asked to perform strict unidirectional data transfer. The complexity of one-way data transfer is such that it is difficult to validate and verify that the controlled interface is not strictly one-way, failsafe and resistant to reconfiguration through administrator error or malicious intent. Additionally, it is difficult to prove in complex systems that data is not bypassing the one way security feature.

As an alternative to software-based one-way data transfer, hardware-based unidirectional interfaces may also be used. A common hardware based approach has been to cut the return lines of RS-232 serial interfaces and then spoof the two-way link layer protocols of a point-to-point Ethernet connection. By maintaining the unidirectional policy of the controlled interface in hardware, the one-way nature and non-bypassable operation of the device can be validated to a high degree of assurance. However, some designs in which the unidirectional aspect of the controlled interface is provided by cable configuration between the enclaves require additional mitigations to ensure against failure due to incorrect configuration.

Highly engineered solutions, such as the Owl Computing Technologies Dual Diode, (described in U.S. Patent. App. Pub. No. US 2008/0259929 A1, the disclosure of which is incorporated herein by reference) provide a direct point-to-point optical link between the enclaves. The unidirectionality of the data transfer is enforced in the circuitry of the network interface cards at both enclave endpoints and in the cable interconnects. In this way, the hardware provides an added layer of assurance of unidirectional information flow and non-bypassable operation. In contrast to software based one-way data transfer systems, it is easy to prove that data is not bypassing the Dual Diode.

Recent advancements in computers and electronics have enabled computer technology to be a routine part of front line military operations. Vehicles and foot soldiers now include multiple devices providing computer readable real-time information as to the status, locations and battle readiness of front line units. It is desirable that these devices remain part of an unclassified domain and communicate their information to a classified enclave for analysis and decision making, thereby simplifying storage, distribution, maintenance and operation of these devices.

Due to its failsafe, non-bypassable operation, a dual-diode approach to transferring data from frontline war fighters to a command and control network is highly desirable. However, conventional dual-diode approaches require processing via software which implements a particular data-filtering algorithm or other security policy. Such software may be implemented as firmware for a microprocessor or as programming for a field programmable gate array (FPGA), for example, and thus the implemented data-filtering algorithm or security policy could be vulnerable to discovery via reverse engineering.

Furthermore, the possibility exists that a dual-diode device might be captured by opposing forces and used, by reversing the input and output connections (to the extent that such operation might be allowed by the security policy in place), to gain access to the command and control network (or other high security enclave).

As a result, it is desirable to provide a hardware device for transferring data from a frontline war fighter to a command and control network which can be selectively and permanently disabled to prevent any reverse engineering of the data-filtering algorithm or security policy stored in a non-volatile memory therein. In addition, such disabling will prevent opposing forces from any attempt to access a high security enclave, such as a command and control network.

SUMMARY OF THE INVENTION

The present invention provides a method and apparatus for ensuring secure data transfer provided in an enclosure. The invention comprises an interface device for controlling data transfer, an integrated circuit coupled to the interface device and having a processor, a non-volatile memory for storing at least program code for the processor, a volatile memory, an input pin and an output pin; and an electrical conductor which electrically connects the input pin and the output pin, wherein the electrical conductor passes through an externally accessible portion of the enclosure to allow a user to easily sever the electrical conductor. In operation, a portion of the program code detects when the electrical conductor is severed and causes the program code in the non-volatile memory to be erased. In a further embodiment, data transfer via the interface device may be selectively disabled and a portion of the program code, upon detection that the electrical conduct has become severed, signals the interface device to disable data transfer. Still further, power for integrated circuit may be selectively provided via the interface device and wherein the program code for the integrated circuit signals the interface controller that erasure of the non-volatile memory is complete and, in response, the interface controller disconnects power to the integrated circuit such that all information in volatile memory is erased. Also, in an embodiment, the external portion of the enclosure comprises a narrow slot. Further, the electrical conductor may comprise a first conductor portion and a second conductor portion removably affixed to the first conductor portion such that the electrical conductor is severed by the user removing the second conductor portion. Still further, the program code may implement a data filtering algorithm on data being transferred and or a security policy which prevents unauthorized use of the device.

In yet a further embodiment, the interface device and the integrated circuit are positioned within a send only circuit portion, wherein the interface device is coupled to a low security host and further comprises a second interface device for controlling data transfer to a high security host; a second integrated circuit coupled to the second interface device and having a processor, a non-volatile memory for storing at least program code for the processor, a volatile memory, an input pin and an output pin; a second electrical conductor which electrically connects the input pin and the output pin on the second integrated circuit, wherein the second electrical conductor passes through an external portion of the enclosure which allows a user to easily sever the second electrical conductor. In operation, a portion of the program code in the second integrated circuit detects when the second electrical conductor is severed and causes the program code in the non-volatile memory in the second integrated circuit to be erased; wherein the second interface device and the second integrated circuit are positioned within a receive-only circuit portion. This further embodiment may further comprise a one-way data link coupling the send-only circuit portion to the receive-only circuit portion. The one-way data link may comprise a data-diode. In an alternate embodiment, the one-way data link may comprise an optical emitter in the send-only circuit portion, a photo detector in the receive-only circuit portion and an optical link coupling the optical emitter and the photo detector which passes from the send-only circuit portion to the receive-only circuit portion.

The present invention is also addressed to a method of ensuring data transfer, comprising passing data from a send-only interface to a receive-only interface under the control of program code running on a processor in an integrated circuit, the program code stored in non-volatile memory in the integrated circuit; detecting when an electrical conductor coupled to input and output pins on the integrated circuit is severed; upon detection of the severing of the electrical conductor, causing the program code stored in non-volatile memory to be erased and passing of data to be halted; and upon completion of erasure of the program code in the non-volatile memory, causing power to be removed from the integrated circuit, thereby erasing all information stored in a volatile memory in the integrated circuit.

BRIEF DESCRIPTION OF THE DRAWINGS

The following detailed description, given by way of example and not intended to limit the present invention solely thereto, will best be understood in conjunction with the accompanying drawings in which:

FIG. 3 is a flowchart showing the operation of an interface controller during the Kill Interrupt state;

FIG. 4 is a flowchart showing the operation of an interface controller during the Kill Active state;

DETAILED DESCRIPTION OF THE PREFERRED EMBODIMENT

Figure 1:
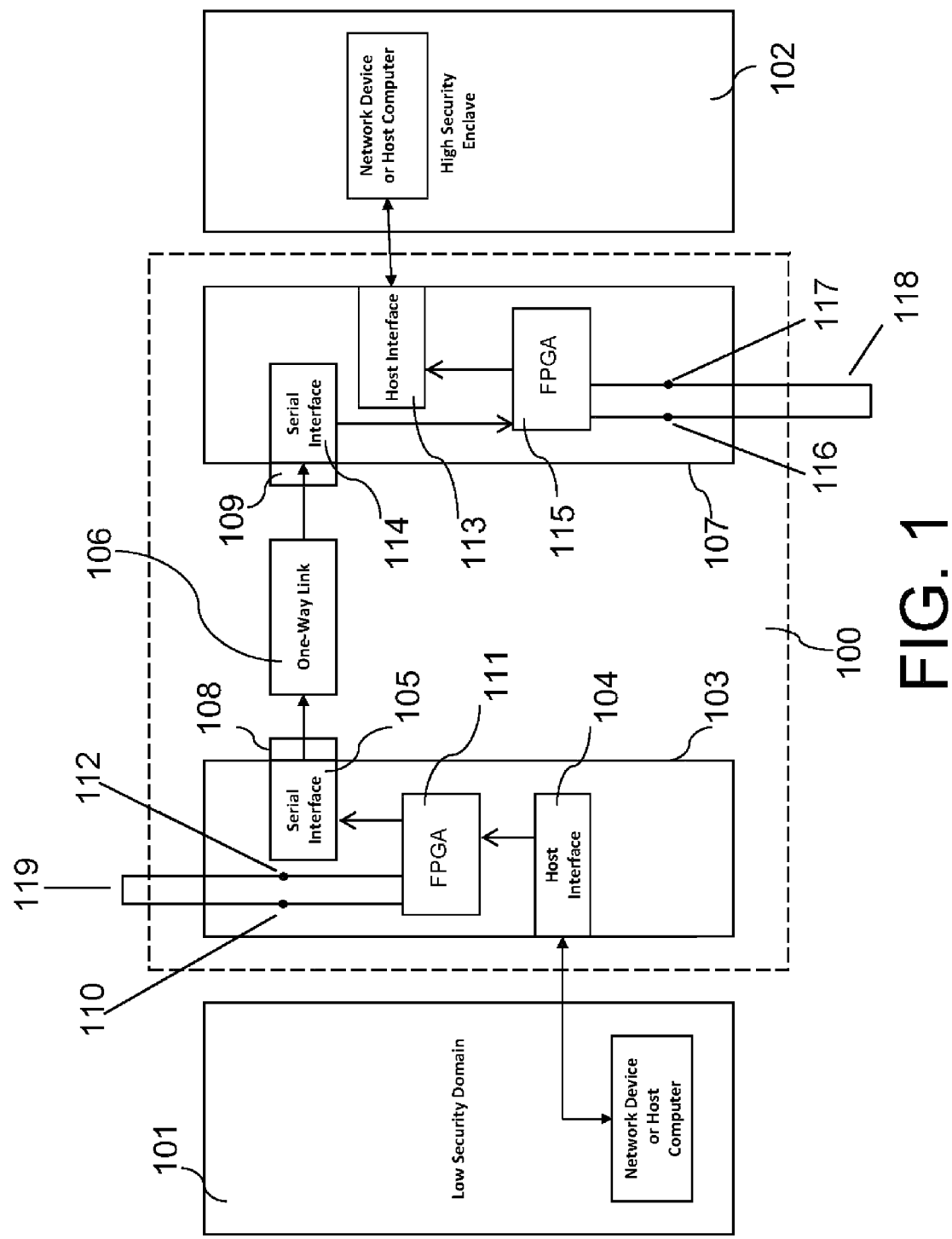
FIG. 1 is a block diagram of an embodiment of the present invention.

Referring now to the drawings and in particular to FIG. 1, the present invention is a device 100 for ensuring secure one-way data transmission from a low security domain 101 to a classified enclave 102 and for providing a way to selectively automatically disable the device 100 and to selectively and permanently erase sensitive information stored therein. The device 100 may operate in conjunction with various operating systems or computing platform types, such as Microsoft Windows and the Unix-based operating systems (e.g., Solaris, Ultrix and Linux).

Data from low security domain 101 is received by send-only network circuitry 103 via a host interface controller 104. Host interface controller 104 may operate according to conventional interface specifications including but not limited to Ethernet, USB, RS-232, IEEE 1394 or may alternatively be a custom interface. Host interface controller 104 is connected via a conventional interconnection to a corresponding interface or a host computer in the low security domain 101. In addition, the interconnection between the low security domain and the host interface controller 104 may optionally be used to power the network circuitry of the present invention. In some embodiments, the host interface controller 104 may be connected via hardened connectors, which may be military specification connectors approved for use in the Future Combat Systems ("FCS") program.

The send-only network circuitry 103 includes a first field programmable gate array (FPGA) 111 which is interconnected between the host interface 104 and a first serial interface 105. As one of ordinary skill in the art will readily recognize, FPGA 111 may be any device having a processor and associated executable logic which executes program code stored in a memory which, as discussed below, may be overwritten (e.g., a non-volatile memory). The first serial interface 105 connects send-only network circuitry 103 to receive-only network circuitry 107 via a single data link 106. In some applications, the device 100 may be used in a battlefield situation to allow data to be uploaded from a local low-security domain 101 to a high-security enclave 102. In some applications, first serial interface 105 may be a UART or equivalent device built into FPGA 111.

The present invention, as described herein, provides a way to ensure that a hostile party is not able to acquire a device 100 and either use it to gain to access the high-security enclave 102 by reversing the connections or to reverse engineer it to obtain either a likely secret data filtering algorithm or any security policy implemented in firmware. The reverse engineering might allow the hostile party to design an attack on the high-security enclave 102 that is able to bypass the data filtering algorithm or allow the hostile party to gain access to the high-security enclave (since the security policy would be known). As discussed below, the present invention provides a way to quickly and easily incapacitate the device 100 and prevent it from being reverse engineered.

In particular, one-way data link 106 may comprise an optical isolator that includes an optical emitter 108 and an optical detector 109. In such embodiments, the send-only network circuitry 103 does not have any photodetection equipment and, likewise, the receive-only network circuitry 107 does not have any photoemission circuitry, there is therefore no possibility of reverse data flow. In this way, the unidirectionality of data flow from the low security domain 101 to the high security enclave 102 may be strictly enforced. While data link 106 may comprise an optical fiber coupled to a photoemitter 108 and a photodetector 109, it will be realized that other embodiments are possible. For example, data link 106 may comprise a STP communication cable or a trace on a printed circuit board.

The receive-only network circuitry 107 mirrors send-only circuitry 103 and comprises a second serial interface 114, a FPGA 115, and a second host interface controller 113. In some applications, second serial interface 114 may be a UART or equivalent device built into FPGA 115. As one of ordinary skill in the art will readily recognize, FPGA 115 may, like FPGA 111, be any device having a processor and associated executable logic which executes program code stored in a memory which, as discussed below, may be overwritten (e.g., a non-volatile memory). Second host interface 113 connects receive-only network circuitry to high security enclave 102. Like first host interface controller 104, second host interface controller 113 may operate according to any conventional interface specification including but not limited to Ethernet, USB, RS-232, IEEE 1394 or may alternatively be a custom interface. The connector coupled to second host interface controller (not shown) may be plugged into corresponding standard sockets in the host computers and devices of the high security enclave 102 and can also be used to provide power for device 100. In some embodiments, the host interface controller 113 may be connected to hardened connectors, which may be military specification connectors approved for use in the Future Combat Systems ("FCS") program.

In the present invention, the unidirectionality of data flow from the send side to the receive side may be further enforced by software residing in FPGAs 111 and 115. For example, in embodiments in which host interfaces controllers 104 and 113 are USB controllers, unique product identifications, based on the CDC/ACM class codes used for USB to serial device emulation may be assigned to send-only circuitry 103 and receive-only circuitry 107. Firmware residing in memory within FPGAs 111 and 115 can then be configured such that each USB interface can only communicate with devices having predetermined product identifications. By configuring each USB interface to communicate only with preselected devices, network appliance 100 cannot be used to transfer data from the receiving network to a send network by "reversing" the connections to the USB interfaces, by connecting a device on the receiving network to the send-side host interface 104. That is, such changes in the firmware residing in FPGAs 111 and 115 may be used to further reinforce the unidirectionality of the data flow from the sending network to the receiving network.

Alternatively, FPGAs 111 and 115 may provide data filtering capability to ensure that certain types of data, e.g., executable code which is potentially harmful such as a virus, Trojan Horse or other malware, is never passed to the high security enclave 102. Such data filtering is performed in software, and the code for such software is stored as firmware in FPGAs 111 and 115.

One-way data flow from the low security domain 101 to the high security enclave 102 through an exemplary embodiment of the present invention 100 can be described as follows: Data to be transmitted from the low security domain 101 may first be transferred to the send-only network circuitry 103 of the present invention via first host interface controller 104. The data may then be transferred via FPGA 111 operating under the control of commands stored in a program memory therein to first serial interface 108, and transmitted across one-way data link 106. FPGA 111 also filters and/or applies a security policy to the data before such data is provided to first serial interface 108. The transmitted data is received by second serial interface 114 and transferred via FPGA 115 operating under the control of commands stored in program memory therein to second host interface controller 113. FPGA 115 also filters and/or applies a security policy to the data before such data is provided to second host interface controller 113. From there, the data may be uploaded to machines residing in the high security enclave 102.

According to some embodiments, both the send-only network circuitry 103 and receive-only network circuitry 104 may be configured to implement two-way data transmission protocols to pace the flow of data across the one-way data link. One method of implementing two-way protocols may be through the use of TCP/IP socket-based proxy software residing in both the send-only program memory in FPGA 111 and the receive-only program memory in FPGA 115. In some embodiments, the TCP proxy application in the send-only program memory may fully implement TCP/IP based bilateral communications between send-only network circuitry and the low security domain 101. TCP session managing applications in send-only program memory may emulate the handshaking and control protocols used in bilateral TCP communications. In this way, the send-only network circuitry 103 may communicate with the host computer in low security domain 101 to regulate the flow of data across the one-way interface. Similarly, the receive-only network circuitry 107 may be configured to include TCP/IP socket-based proxy software in program memory for communicating with a host computer in secure enclave 102. By implementing two-way protocols such as those described above, transmission speeds of 1 Mbps or more may be attained.

FPGA 111 includes an output pin 110 and an input pin 112 that are connected by a wire or other type of electrical conductor 119. Similarly, FPGA 115 includes an output pin 116 and an input pin 117 that are connected by a wire or other type of electrical conductor 118. Electrical conductors 118 and 119 pass outside of the housing for device 100, and, in one embodiment, cross a thin slot in the housing. Upon the application of power to the device 100, each FPGA 111, 115 will begin to transmit a secret code at regular intervals on respective output pins 110, 116. The secret code will be received on respective input pins 112, 117 so long as the electrical conductors 118 and 119 remain intact. Normal operation continues while the respective FPGA 111, 115 receives a looped back version of the secret code on respective input pins 112, 117. However, when electrical conductors 118, 119 are severed, respective FPGA 111, 115 will not receive the looped back version of the secret code, and an FPGA Kill routine will be triggered, instead of normal operation.

In the event that device 100 is employed in the field, a user, upon any threat by for example a hostile party, can sever the wires 118, 119, to incapacitate the device and to erase all of the programming in the FPGA non-volatile memory. As discussed below with respect to FIGS. 5A and 5B, the wires 118, 119 are positioned in a manner which makes it easy to sever the wires in an emergency, but which also makes the risk of inadvertent severing highly unlikely.

In the FPGA, like a microcontroller, upon power-up, the program code (firmware) is first loaded into volatile memory (e.g., RAM) from non-volatile memory (e.g., EEPROM). The program code thus operates from RAM independently, after power-up, from the contents of the EEPROM. The program code causes two steps to be performed to disable the device. When an FPGA Kill routine is initiated, the first step is to erase the EEPROM (or other type of non-volatile memory) and the second step is to power down the FPGA to delete the program code from RAM (volatile memory). In addition, each interface controller stops passing all data as soon as it learns that the FPGA Kill routine has been initiated, and updates internal status flags in non-volatile memory in the interface controller to provide status to the external host(s).

Figure 2:
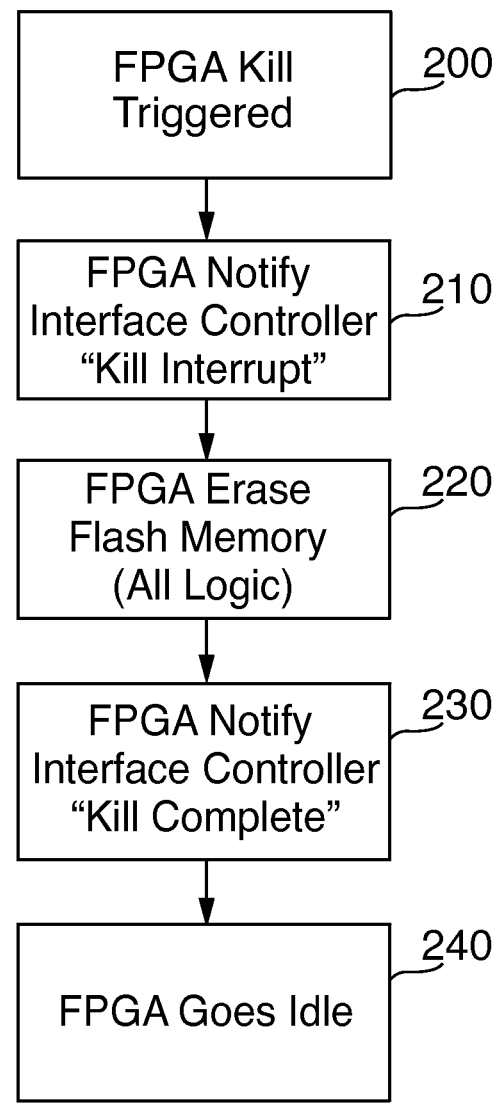
FIG. 2 is a flowchart showing the operation of a FPGA after a Kill Interrupt is triggered.

The FPGA Kill routine performed by the FPGA is shown in FIG. 2. Upon initiation of the FPGA Kill routine, step 200, the FPGA provides a Kill Interrupt to the associated interface controller at step 210. Then, the FPGA erases all of the non-volatile memory in the FPGA at step 220. Once the non-volatile memory in the FPGA is completely erased, the FPGA provides a Kill Complete message to the associated interface controller at step 230. Finally, the FPGA goes idle at step 240.

FIGS. 3 and 4 show the operations performed by the interface controllers before and during the FPGA Kill routine. In FIG. 3, the interface controller Kill Interrupt routine 300 starts by checking, at step 310, for receipt of the Kill Interrupt from the associated FPGA (step 210 in FIG. 2). If the Kill Interrupt has not been received, processing returns at step 340 to normal operation. If the Kill Interrupt has been received, processing proceeds to step 320, where the interface controller disables all data flow, and to step 330, where the interface controller sets a flag (or other indicator) in its internal non-volatile memory indicating that the device 100 is in the Kill Active state. This flag is accessible by the external device connected to the interface controller and allows the external device to determine that the device 100 is in the Kill Active state and will no longer provide data communications. Thereafter, processing returns at step 340 to wait for the associated FPGA to complete the erasure of all of the non-volatile memory therein.

Once the associated FPGA completes the erasure of the non-volatile memory, the FPGA provides a Kill Complete signal (step 230 in FIG. 2). The interface controller Kill Active routine 400 in response to the Kill Complete signal is shown in FIG. 4. Receipt of the Kill Complete signal is detected at step 410, if not received, processing returns at step 440. If the Kill Complete signal is received, processing proceeds to step 420, where the interface controller disables the power connection to the associated FPGA, thereby causing all of the information stored in volatile memory (RAM) to be erased and thus permanently disabling the FPGA (since the non-volatile memory was previously erased). Next, processing proceeds to step 430, where the interface controller changes its current state to Kill Complete in non-volatile memory, so that any device interconnected thereto will be able to determine that device 100 is completely disabled and will not provide any data communications.

Figure 5A:
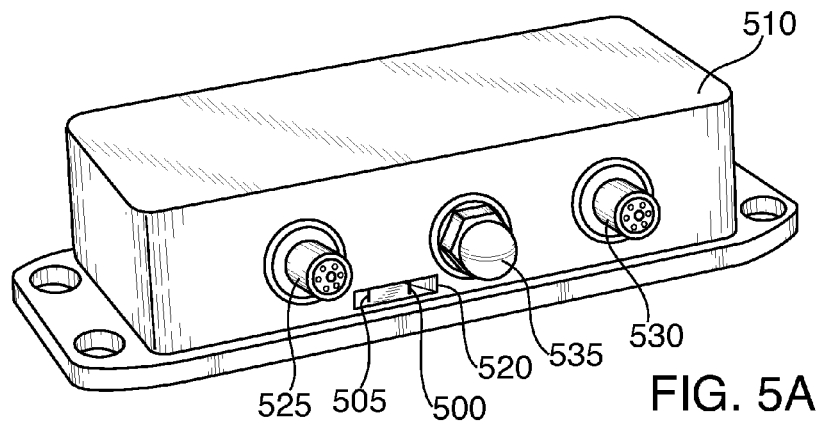
FIG. 5A shows one embodiment of the present invention with kill wires positioned in a first type enclosure and FIG. 5B shows another embodiment of the present invention with kill wires positioned in a second type enclosure.

FIG. 5A is a drawing showing an embodiment of the present invention in which the kill wires 500, 505 are positioned in a slot 520 on an external portion of the housing 510. As shown in FIG. 5A, housing 510 also includes in input connector 525, an output terminal 530 and a ground connection 535. By placing the two kill wires, corresponding to wires 118 and 119 in FIG. 1, across the slot 520 in a recessed area thereof, a user desiring to activate the Device Kill routine can easily sever the wires by sliding a flat object through the slot, but a subsequent user will not be able to see the severed wires in the slot and will not know that the FPGAs have been erased and powered down. Any subsequent user will not be able to use the device of the present invention, as it will be permanently disabled, as described above, very shortly after the wires are cut. Once initiated, the software routines are not reversible and the device will not be able to be used for any data communications. In particular, after the Device Kill operation is performed, a user will not be able to reverse the input and output connectors for unauthorized access to the high security enclave 102 in FIG. 1. Furthermore, a user will not be able to reverse engineer the software code in the FPGA to determine any special processing performed during data transmission, e.g., a secret data-filtering algorithm or a secret security policy, since the firmware for such software code was previously erased during the Device Kill operation. As one of ordinary skill in the art will readily recognize, there are many ways to position the kill wires 500, 505 to allow a user to break the electrical connection formed by such wires (and thereby initiating the FPGA Kill routine), while at the same time preventing unintentional severing of the wires.

In an alternative embodiment, the kill wires 500, 505 may alternatively be routed through a slot or hole in a non-conductive screw mounted in the housing, with the kill wires 500, 505 positioned in an internal portion of the housing. A user, by turning the head of the screw, would cause the two wires 500, 505 to break.

Figure 5B:
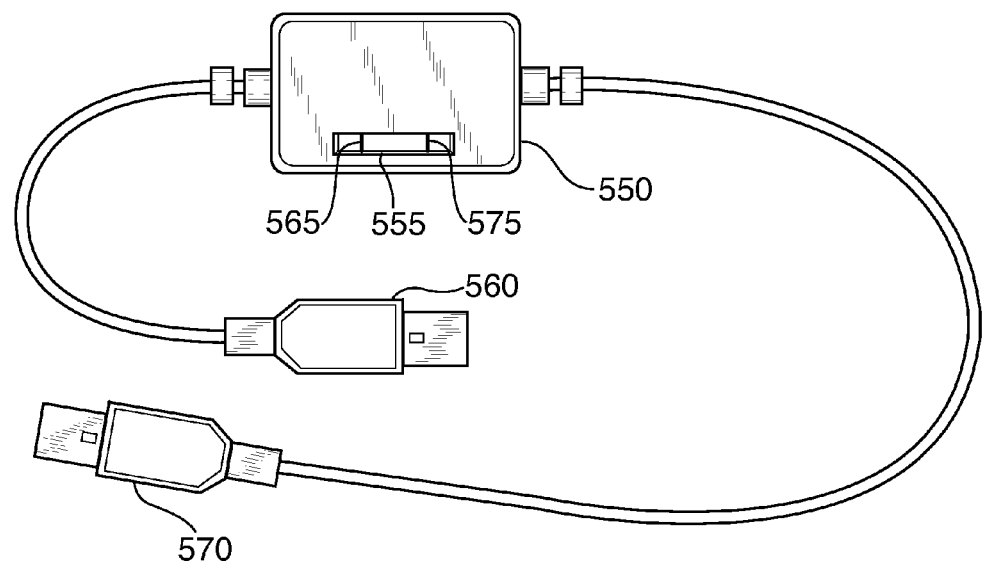

Similarly, in FIG. 5B, kill wires 565, 575 are positioned in a slot 555 on an external portion of the housing 550. As shown in FIG. 5B, housing 550 also includes in input connector 560 and an output connector 570, each coupled to the housing 550 via an associated cable 580, 590.

Figure 6:
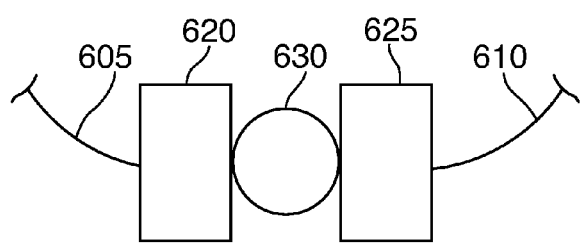
FIG. 6 shows an alternate embodiment used to break open the kill wire connection of the present invention.

FIG. 6 shows another alternate embodiment of breaking the electrical connection formed by the kill wire 118, 119 shown in FIG. 1. Instead of breaking the wire forming the electrical connection, as in prior embodiments, the kill wire is instead formed by two wires 605 and 610, one connected to an input terminal of the associated FPGA and the other connected to an output terminal of that FPGA (not shown in FIG. 6). Each wire 605, 610 is also connected to an associated terminal 620, 625. Terminals 620, 625 are fixedly mounted and spaced apart so that when a conductive member 630 is inserted between terminal 620 and terminal 625, terminals 620 and 625 are electrically connected. By mounting terminals 620 and 625 adjacent to an aperture in housing 510, for example, conductive member 630 may be mounted in a way to allow a user to easily remove conductive member 630, e.g., by use of a special tool. As one of ordinary skill in the art will readily recognize, many different ways can be devised to establish an electrical connection between the input and output pins on each FPGA (e.g., FPGAs 111 and 115 in FIG. 1) which, when the electrical connection is broken, will cause the device to become permanently disabled. The key part is to ensure that a user has readily access to the means for breaking or severing the electrical connection forming the kill wire, but at the same time ensuing that the kill wire is protected during ordinary use to ensure that the kill wire is not accidently broken or severed.

While the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. A communications device for ensuring secure data transfer, the communications device provided in an enclosure, comprising:

an interface device for controlling data transfer;

an integrated circuit coupled to the interface device and having a processor, a non-volatile memory for storing at least program code for the processor, a volatile memory, an input pin and an output pin;

an electrical conductor which electrically connects only the input pin and the output pin and which is not part of a pathway for the secure data transfer, wherein the electrical conductor is positioned in an externally accessible portion of the enclosure to allow a user to easily sever the electrical conductor;

wherein a portion of the program code detects when the electrical conductor is severed and causes the program code in the non-volatile memory to be erased;

wherein the interface device and the integrated circuit are positioned within a send only circuit portion, wherein the interface device is coupled to a low security host, the communications device further comprising:

a second interface device for controlling data transfer to a high security host;

a second integrated circuit coupled to the second interface device and having a processor, a non-volatile memory for storing at least program code for the processor, a volatile memory, an input pin and an output pin;

a second electrical conductor which electrically connects only the input pin and the output pin on the second integrated circuit and which is not part of a pathway for the secure data transfer, wherein the electrical conductor is positioned in an externally accessible portion of the enclosure to allow a user to easily sever the second electrical conductor; and wherein a portion of the program code in the second integrated circuit detects when the second electrical conductor is severed and causes the program code in the non-volatile memory in the second integrated circuit to be erased;

wherein the second interface device and the second integrated circuit are positioned within a receive-only circuit portion.

2. The communications device of claim 1, further comprising a one-way data link coupling the send-only circuit portion to the receive-only circuit portion.

3. The communications device of claim 2, wherein the one-way data link comprises a data-diode.

4. The communications device of claim 2, wherein the one-way data link comprises an optical emitter in the send-only circuit portion, a photo detector in the receive-only circuit portion and an optical link coupling the optical emitter and the photo detector which passes from the send-only circuit portion to the receive-only circuit portion.

* * * * *